United States Patent
Hsueh et al.

(10) Patent No.: US 10,986,103 B2
(45) Date of Patent: Apr. 20, 2021

(54) SIGNAL TOKENS INDICATIVE OF MALWARE

(71) Applicant: HEWLETT-PACKARD DEVELOPMENT COMPANY, L.P., Houston, TX (US)

(72) Inventors: Frank Chijeen Hsueh, Sunnyvale, CA (US); Sejal Pranlal Kamani, Sunnyvale, CA (US)

(73) Assignee: Micro Focus LLC, Santa Clara, CA (US)

(*) Notice: Subject to any disclaimer, the term of this patent is extended or adjusted under 35 U.S.C. 154(b) by 530 days.

(21) Appl. No.: 14/905,496

(22) PCT Filed: Jul. 31, 2013

(86) PCT No.: PCT/US2013/052983
§ 371 (c)(1),
(2) Date: Jan. 15, 2016

(87) PCT Pub. No.: WO2015/016901
PCT Pub. Date: Feb. 5, 2015

(65) Prior Publication Data
US 2016/0156646 A1 Jun. 2, 2016

(51) Int. Cl.
*H04L 29/06* (2006.01)
*G06N 20/00* (2019.01)
*G06F 21/56* (2013.01)
*G06N 7/00* (2006.01)

(52) U.S. Cl.
CPC .......... *H04L 63/1416* (2013.01); *G06F 21/56* (2013.01); *G06F 21/562* (2013.01); *G06F 21/563* (2013.01); *G06N 7/005* (2013.01); *G06N 20/00* (2019.01); *H04L 63/10* (2013.01); *H04L 63/20* (2013.01)

(58) Field of Classification Search
CPC ................................ G06F 21/56; G06F 21/562
See application file for complete search history.

(56) References Cited

U.S. PATENT DOCUMENTS

| | | | |
|---|---|---|---|
| 7,284,274 B1 * | 10/2007 | Walls | G06F 8/70 726/25 |
| 7,882,187 B2 | 2/2011 | Gammage et al. | |
| 2003/0065926 A1 | 4/2003 | Schultz et al. | |
| 2003/0212902 A1 | 11/2003 | van der Made | |
| 2008/0141376 A1 | 6/2008 | Clausen et al. | |
| 2009/0070459 A1 | 3/2009 | Cho et al. | |

(Continued)

FOREIGN PATENT DOCUMENTS

| | | |
|---|---|---|
| EP | 2182460 | 5/2010 |
| EP | 2199941 | 6/2010 |

OTHER PUBLICATIONS

International Search Report & Written Opinion, dated Apr. 28, 2014, PCT Patent Application No. PCT/US2013/052983, 9 pages.

(Continued)

*Primary Examiner* — James R Turchen

(57) ABSTRACT

Example embodiments disclosed herein relate to generate signal tokens indicative of malware. A code analysis is performed on known malware application code and known clean application code to generate tokens. Signal tokens indicative of malware are generated based on groupings of the tokens.

16 Claims, 3 Drawing Sheets

(56) References Cited

U.S. PATENT DOCUMENTS

| | | | |
|---|---|---|---|
| 2009/0320133 A1 | 12/2009 | Viljoen et al. | |
| 2010/0083240 A1* | 4/2010 | Siman | G06F 16/245 717/144 |
| 2011/0010697 A1 | 1/2011 | Golovkin | |
| 2011/0041179 A1* | 2/2011 | Ståhlberg | G06F 21/566 726/23 |
| 2011/0162070 A1* | 6/2011 | Krasser | G06F 21/564 726/23 |
| 2012/0060142 A1* | 3/2012 | Fliess | G06F 11/3428 717/102 |
| 2012/0158626 A1* | 6/2012 | Zhu | H04L 63/1408 706/13 |
| 2012/0210423 A1* | 8/2012 | Friedrichs | H04L 63/1416 726/22 |
| 2012/0260342 A1 | 10/2012 | Dube et al. | |
| 2012/0304244 A1 | 11/2012 | Xie et al. | |
| 2012/0317645 A1* | 12/2012 | Fortier | G06F 21/562 726/24 |
| 2013/0091571 A1 | 4/2013 | Lu | |
| 2013/0097706 A1* | 4/2013 | Titonis | G06F 21/56 726/24 |
| 2013/0111547 A1 | 5/2013 | Kraemer | |
| 2013/0159964 A1* | 6/2013 | Szpak | G06F 11/3696 717/105 |
| 2014/0181973 A1* | 6/2014 | Lee | G06F 21/562 726/23 |
| 2014/0201838 A1* | 7/2014 | Varsanyi | G06F 21/552 726/23 |
| 2014/0245440 A1* | 8/2014 | Reynolds | G06F 21/563 726/23 |
| 2014/0283037 A1* | 9/2014 | Sikorski | G06F 21/563 726/22 |

OTHER PUBLICATIONS

Rieck, K., et al., Automatic Analysis of Malware Behavior Using Machine Learning, Journal of Computer Security, Dec. 13, 2010, 30 pages.

Extended European Search Report dated Feb. 24, 2017 for EP application No. 13890383.6 (8 pages).

* cited by examiner

SIGNAL TOKENS INDICATIVE OF MALWARE

BACKGROUND

Service providers and manufacturers are challenged to deliver quality and value to consumers, for example by providing applications to users, Computer systems and personal computers have been targets of malware or malicious software programs. Further, malware developers have started developing malware for mobile devices such as smartphones.

BRIEF DESCRIPTION OF THE DRAWINGS

The following detailed description references the drawings, wherein.

DETAILED DESCRIPTION

Malware attacks are being written towards mobile devices such as smartphones and tablets. Mobile malware is rising and is threatening to steal money from consumers. Application stores or marketplaces, such as proprietary stores and alternative marketplaces are becoming widely popular and have become a target of mobile malware attacks. Mobile malware detection has proven to be an elusive and challenging target. Amongst other reasons for challenges, malware applications can easily change their signatures to trick and bypass detection by virus scanners using signatures. Moreover, performing a dynamic analysis on an application is costly and time consuming. As such, unknown malware can be challenging to detect during installation at an end user's device or when being provided at an application marketplace.

Accordingly, various embodiments disclosed herein relate to an approach to generate signal tokens to help detect malware applications. The approach offers low cost and low computational power benefits as well as providing fast detection of malware applications from benign applications at the time of installation.

A static analysis engine can be used to perform byte code analysis on binaries that may be stored on a particular marketplace or multiple marketplaces to generate tokens. In certain examples, a token is a set of raw data of the application that causes a rule to fire. The binaries can be configured to run on a particular type of operating system or multiple types of operating systems. Examples of operating systems include ANDROID, WINDOWS, IOS, SYMBIAN, etc. The binaries can include a portion that are known to be clean as well as a portion that are known to have malware. The results of the byte code analysis can be run through a heuristic evaluation process to generate signal tokens that can be used to categorize unknown application as being either malware or benign. As such in some examples, signal tokens are processed items that can be recorded as a discrete entry in a malware likeliness database. As such, the signal tokens can be used in a malware-determination process to determine whether an unknown application includes malware based on a Bayesian analysis on the signal tokens compared to tokens generated from the unknown application.

Figure 2:
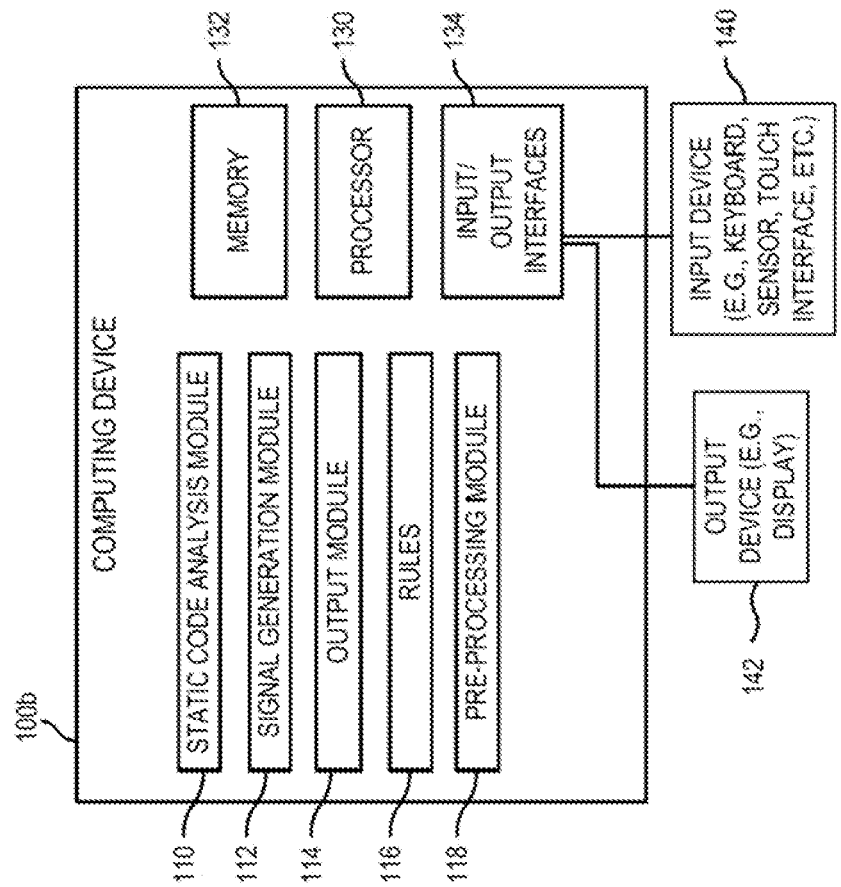
FIGS. 1 and 2 are block diagrams of computing devices capable of generating signal tokens indicative of malware, according to various examples.
Figure 1:
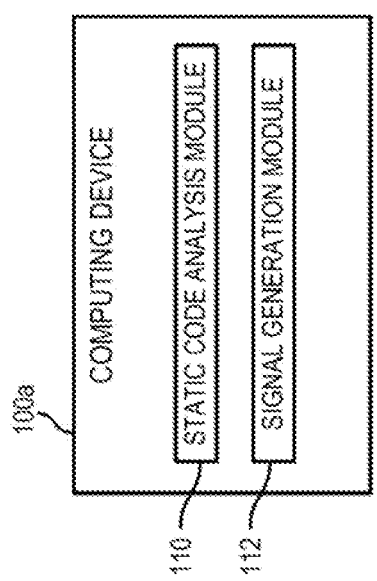

FIGS. 1 and 2 are block diagrams of computing devices capable of generating signal tokens indicative of malware, according to various examples. Computing devices 100a, 100b include components that can be utilized to generate signal tokens that can be used to determine whether application code or an application binary includes malware. The respective computing devices 100a, 100b may be a notebook computer, a desktop computer, a tablet computing device, a wireless device, a server, a workstation, or any other computing device. In some examples, the computing device 100 can connect to one or more databases including one or more sets of application code that are known to either include malware or not include malware. Further, the application code can be in the form of binary or another form (e.g., as a written language, Extensible Markup Language (XML), etc.).

The computing device 100 may include a static code analysis module 110 and a signal generation module 112. The computing device 100 can further include an output module 114, rules 116, a pre-processing module 118 at least one processor 130, memory 132, and input/output interfaces 134, Moreover, the computing device 100b may include and/or use one or more input device 140 or output device 142. In one example, the memory 132 can store instruction aspects of the modules 110-114, 118 in memory 132 and the processor(s) 130 can execute the instructions.

The static code analysis module 110 can be used to determine a first and second set of tokens based on a static code analysis respectively performed on a first set of known malware application code and a second set of known clean application code. As noted above, the application code can be in the form of binaries. In one example, the binaries can be in the form of ANDROID binaries (e.g., apk files). These files can be unzipped and run through a dex2jar utility tool to convert one or more .dex files within the ARK zip to .jar files. The results can include a binary XML file. Another tool can be used to convert the binary XML into a readable XML format. This is a specific example of one implementation. It should be noted that other example implementations can be used specific to tools and frameworks of varying applications and/or operating systems. In some examples, a pre-processing module 118 can be used to convert a binary into a form where it can be tokenized.

Tokenization is a process to break down a stream of text into words, phrases, symbols, or other meaningful elements called tokens. The list of tokens can become input for further processing by the signal generation module 112. In some examples, the tokens can be marked as being associated with malware binaries/code or being associated with benign or clean binaries/code. The information can be tagged to individual tokens or the tokens can be monitored in another way, for example, by separating the tokens into sets, listing the tokens in another data structure, etc.

The tokens generated can be according to rules 116. In some examples, the rules can include obfuscation tolerant rules. Obfuscation is a technique that is often applied to code to make a program more resistant to reverse engineering. Obfuscation is used by both malware to hide its malware nature as well as non-malware (e g., to protect intellectual property from reverse engineering). Obfuscation-tolerant rules can be considered rules that work regardless of whether a program has or has not been purposefully obfuscated.

In one example, taint analysis can be used. Taint analysis attempts to identify variables that have been 'tainted' and traces them to possible vulnerable functions that can be considered a 'sink.' If a tainted variable gets passed to a sink without first being sanitized, it can be flagged.

In a specific example of malware associated with toll fraud, malware would call a function to send a text message to a destination address and a payload. The malware program would need to provide the method with relevant parameters. To hide its intent, the malware may use encryption for the various addresses and use an overly complicated call graph (e.g., A calls B calls C call D, which calls the function to send the text message). An obfuscation tolerant rule in this case could put a taint on the encrypted string constant and a sink on the destination address. This would work if the call-graph was simple and not obfuscated or complicated by purposeful obfuscation.

Other examples of rules to generate tokens include rules associated with manifest XML (e.g., rules associated with an ANDROID manifext XML file), structural rules, for example, rules that examine the structural relationship of elements within a program's abstract syntax tree and relationship types (e.g., A calls B, A is a subclass of B, C is a type used in D's method, etc.), characterization rules (e.g., to apply a technical property to a function based on a structural relationship or structural property; the technical property can be related to, e.g., dataflow entry points, passthroughs, sinks, etc.), dataflow rules (e.g., taint analysis), control flow rules (e.g., a type of analysis that matches patterns of code going through a particular call graph), semantic rules (e.g., use of certain Application Programming Interfaces (APIs)), etc. When a rule is fulfilled or hit, a token for the rule can be generated. In one example, tokens can be associated with each application. In another example, the tokens can be associated with either being associated with a known malware application or a known clean application.

Rules can be highly customized for a particular language, operating system, device or device set, etc. For example, in a device capable of toll fraud, the invocation of a send text message function from within a service component of an application could be considered a strong indicator of toll fraud malware, which sends premium text messages such as short message service (SMS) messages without user consent for monetary gains.

Another example is rooting the device. In the case of a LINUX based operating system, such as ANDROID, applications can be considered LINUX processes with access limited to their own process space. Rooting the device to gain privileged access typically involves use of LINUX commands such as su, chmod, chown, etc. Detecting the presence of these commands can raise flags on the suspicious nature of an application. These can be considered privileged access indicators.

Another example is the abuse of a permission model. In some examples, an operating system may require applications to request user permission during installation for access to system services. Malware applications tend to request permissions, from unsuspecting users, to system resources that may compromise user privacy and/or security. Examples can be specific to the type of operating systems and can include call privileges, access location privileges, access to contacts, processing of outgoing calls, reading a call log, reading a calendar, reading external storage, recording audio, using other peripheral devices (e.g., a camera) or input/output interfaces 134, etc.

Further, one example includes applications installed as services. These applications may use system intent in this scenario. On receiving an intent (e.g., boot complete), the application can start a malicious service silently in the background to harvest user data or communicate with central control and command servers without user content or knowledge. Applications that register for the event to run as services may be targeted by rules for further scrutiny.

Moreover, rules can target calls to sensitive APIs such as APIs to retrieve phone specific information such as device IDs, location information (e.g., cell information, positioning system information, etc.) serial numbers of SIM cards, etc, from within service components.

Another example includes the use of reflection and/or dynamic loading of executables. JAVA reflection capabilities to dynamically load binaries at runtime may be abused by malware to download instructions and malicious binaries from a central command and control server. Operating system APIs that create subprocesses and/or JAVA API calls such as calls to load( ), loadClass( ), loadLibrary( ), forName( ), and getMethod( ) that would facilitate use of dynamic features can indicate malware.

Additionally, another example includes a privacy violation. Access and/or mishandling of sensitive information such as writing sensitive information to external storage (e.g., via a write call to getExternalStorage( )), or system logs with a Log.w( ) can be considered a sign of negligence and/or abuse of user information by an application and can be flagged by rule to generate a token.

The presence of any one of these features may not be sufficient to classify an application as malware, but the presence of multiple of these features together with a density and/or collocation of these features can be used to perform a heuristic evaluation of an application to classify the application as malware or benign. Machine learning can be used to create signal tokens from sets of tokens generated by the rules. Further, a one or more signal tokens can be grouped based on density and/or collocation of features/tokens. In some examples, the grouping can be based on the amount of these features within a certain code segment, function, etc.

The signal generation module 112 can process the tokens to generate a set of signal tokens that are indicative of malware based on groupings of the tokens. The signal tokens can be used in a malware determination process based on on Bayesian classification. Bayesian classification is an approach that can be used to minimize the probability of misclassification. Other types of classification training that minimizes the probability of misclassification can be used as well, such as text classification. In spam filtering, Bayesian spam filtering is used to calculate the probability that an email is or is not spam. Similar approaches can be used to determine whether malware is or is not present because of the presence of one or more tokens.

Training sets can be tokens associated with each respective application as well as whether or not the respective application includes malware or is benign. Groupings of two or more of the tokens can be used to generate the signal tokens. For example, the training can notice that certain tokens are common to each application and therefore are not indicative of malware, but a combination of multiple tokens can be used to detect malware (e.g., because the combination is present in multiple malware application code, but not in benign application code). In one example, the training can further be based on one or more rules or criteria. For example, a set of tokens can be used to generate a signal token if the number of tokens across multiple malware applications is above a threshold level. Moreover, the signal token generation can further be qualified by not being associated with more than a second threshold number of benign applications. As such, the training allows the signal token database to represent a real, discrete, and/or non-correlated application property. In one example, a real property is a property that represents an aspect of an application. In another example, a discrete property is one that is need not be broken down further and thus need not be a rollup of multiple properties unless for a particular reason. A non-correlated property represents that each signal token can be linearly independent of other signal tokens. As such, if multiple signal tokens are used in a particular Bayes analysis of an application, a real aspect of the application need not be overly considered (e.g., signal tokens that represent the same real aspect of the application need not be considered separately).

In one example, malware may tend to include a high percentage of findings per line of code when compared to non-mobile or benign mobile applications. Moreover, in addition to a high density of semantic issues that fingerprint malware exploits, malware applications are often poorly coded and/or include a high percentage of control flow and data flow security vulnerabilities that can be used to generate remote attacks. As such, in some examples, the groupings can be based on at least one or at least two of a null dereference, resource leak, dead code, path manipulation, query string injection, command injection, resource injection, poor style, bad practices, and denial of service. Some of these, such as dead code and having poor style may be intentionally embedded to distract reverse engineering and/or intrusion detection efforts. Others, such as path manipulation and resource injection may be left as security holes to allow for remote control and attack of the device. Moreover, the presence of bad practices issues such as calls to System.exit( ), System.gc( ), and Thread.sleep( ) that can generate denial of service attacks or collect system information for future attacks may be parts of the groupings.

Other groupings can also be used. Moreover, groupings can be based on a correlation between the presence of certain application features, which can be flagged by specialized malware rules, and malware applications. Moreover, in malware applications, findings of the features are not typically isolated, but found in clusters suggesting a high probability of malicious intent. In one example, the malware application can be identified because the malware application retrieves multiple types of device specific data. For example, the malware application would retrieve all of the device specific attributes, such as device ID, SIM card identifier, line number, etc. As noted above, the groupings signaling malware can be based on machine learning techniques.

The output module 114 can output the signal tokens to a signal token malware likeness database. The database can be used by the computing device 100 or another computing device to analyze an unknown application, where the unknown modifier indicates that it is not known whether the application includes malware or is benign. A static analysis can be run using a rule portfolio (e.g., the rules used to generate the tokens) on the unknown application. The malware likeliness database and the signal tokens from the unknown application can be fed into a Bayesian Classification technique to make a determination as to whether the unknown application includes malware.

A processor 130, such as a central processing unit (CPU) or a microprocessor suitable for retrieval and execution of instructions and/or electronic circuits can be configured to perform the functionality of any of the modules 110, 112, 114, 118 described herein. In certain scenarios, instructions and/or other information, such as rules 116, can be included in memory 132 or other memory. Input/output interfaces 134 may additionally be provided by the computing device 100b. For example, input devices 140, such as a keyboard, a sensor, a touch interface, a mouse, a communication interface, a microphone, etc. can be utilized to receive input from an environment surrounding the computing device 100b. Further, an output device 142, such as a display, can be utilized to present information to users. Examples of output devices include speakers, display devices, amplifiers, etc. Moreover, in certain embodiments, some components can be utilized to implement functionality of other components described herein.

Each of the modules 110, 112, 114, 118 may include, for example, hardware devices including electronic circuitry for implementing the functionality described herein. In addition or as an alternative, each module 110, 112, 114, 118 may be implemented as a series of instructions encoded on a machine-readable storage medium of computing device 100 and executable by processor 130. It should be noted that, in some embodiments, some modules are implemented as hardware devices, while other modules are implemented as executable instructions.

Figure 3:
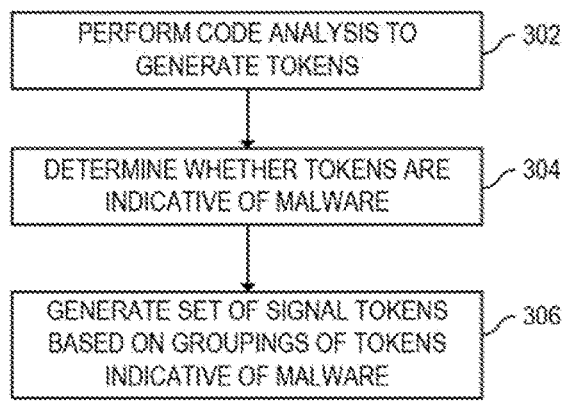
FIG. 3 is a flowchart of a method for generating a set of signal tokens based on groupings of tokens indicative of malware, according to one example.

FIG. 3 is a flowchart of a method for generating a set of signal tokens based on groupings of tokens indicative of malware, according to one example. Although execution of method 300 is described below with reference to computing device 100, other suitable components for execution of method 300 can be utilized (e.g., computing device 500). Additionally, the components for executing the method 300 may be spread among multiple devices. Method 300 may be implemented in the form of executable instructions stored on a machine-readable storage medium, such as storage medium 520, and/or in the form of electronic circuitry.

At 302, the computing device 100 can perform code analysis based on rules on a first set of known malware application code (e.g., using binaries of the application) and a second set of known clean application code (e.g., using binaries of the applications) to generate tokens. In the case of a binary, the binary can be pre-processed as discussed herein. Further, as noted above, the rules can include obfuscation tolerant rules.

At 304, a set of the tokens indicative of malware can be determined. The set can be determined based on machine learning processing of the tokens and their respective associations with clean or malware code. For example, tokens generated largely from both can indicate that the token need not be used in malware analysis, whereas tokens generated more in malware containing code can be considered more indicative of malware. In some examples, a score or other evaluation can be associated with the respective tokens to determine the likeliness that the particular token is indicative of malware.

At 306, the computing device 100 generates a set of signal tokens based on groupings of the tokens indicative of malware. In some examples, the signal tokens are based on machine learning. The machine learning can be based on training sets of applications associated with malware and applications that are known to be benign. In other examples, other machine language tools can be used. As noted above, in some examples, groupings can include at least one of, at least two of: toll fraud, rooting, abuse of permissions, application installed as a service, sensitive data retrieval, use of reflection, use of dynamic loading, and privacy violations. Other groupings can be based on other types of malware. Groupings can also be based on clustering or density of one or more tokens generated.

In one example, toll fraud can include the use of a send text message function. Further, rooting can include gaining privileged access to a computing device executing an application. Moreover, abuse of permissions can include requesting permissions above a particular threshold. Further, sensitive data retrieval can include a call to an API to retrieve device specific information. Additionally, reflection can include the use of a function to download further instructions (e.g., from a server). The signal tokens can be stored in another location and may be used by another device or the computing device to process an application binary or code to determine whether the application binary or code includes malware.

Figure 4:
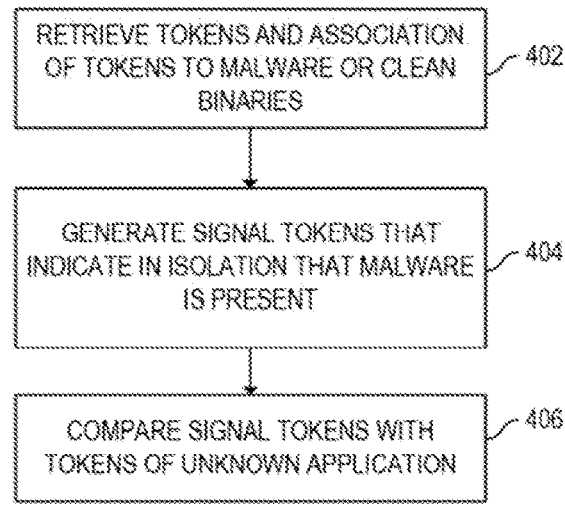
FIG. 4 is a flowchart of a method for generating a signal-token malware likeliness database capable of being used to determine whether an unknown application includes malware, according to one example.

FIG. 4 is a flowchart of a method for generating a signal-token malware likeliness database capable of being used to determine whether an unknown application includes malware, according to one example. Although execution of method 400 is described below with reference to computing device 500, other suitable components for execution of method 400 can be utilized (e.g., computing device 100). Additionally, the components for executing the method 400 may be spread among multiple devices. Method 400 may be implemented in the form of executable instructions stored on a machine-readable storage medium, such as storage medium 520, and/or in the form of electronic circuitry.

At 402, tokens are retrieved from a database. The tokens can be generated using a static analysis of code. The tokens can also be associated with a malware application or a clean application binary or code. The static analysis can be based on obfuscation tolerant rules. The tokens may also be grouped based on particular applications. In some examples, tokens may be tagged to particular applications from which they were found. In some examples, the amount of times a token is generated can also be counted and recorded with the token. Moreover, the number of times a token is associated with a benign application and/or a malware ridden application can be counted and stored in a data structure associated with the token.

At 404, the computing device 500 can perform training on the tokens to generate signal tokens that indicate in isolation that malware is present. The signal tokens can be based on groupings of tokens. In one example, each of the tokens can be given a score based on the number of times the token is associated with malware and the number of times the token is associated with a benign application. The score can represent how likely the token is indicative of malware. The training can be used to determine which combinations of the tokens are more likely to indicate malware.

A signal token malware likeliness database can be generated from the signal tokens. The signal token malware likeliness database can be used to determine whether malware is included in an application where a computing device processing the application does not know whether the application is malware or not.

At 406, the computing device or another computing device can be used to compare the signal tokens with tokens of an unknown application to determine whether that application includes malware. In one example, this can be accomplished by performing Bayes classification on the signal tokens and comparing to the tokens generated by processing the unknown application via the tokenization process.

In one example, the Bayes classification works by correlating the use of the tokens with malware and non-malware applications. A Bayesian inference is then used to calculate a probability that an application is or is not malware. In some examples, the approach can be similar to Naïve Bayes spam filtering working on tokens generated from known spam and non-spam emails.

Figure 5:
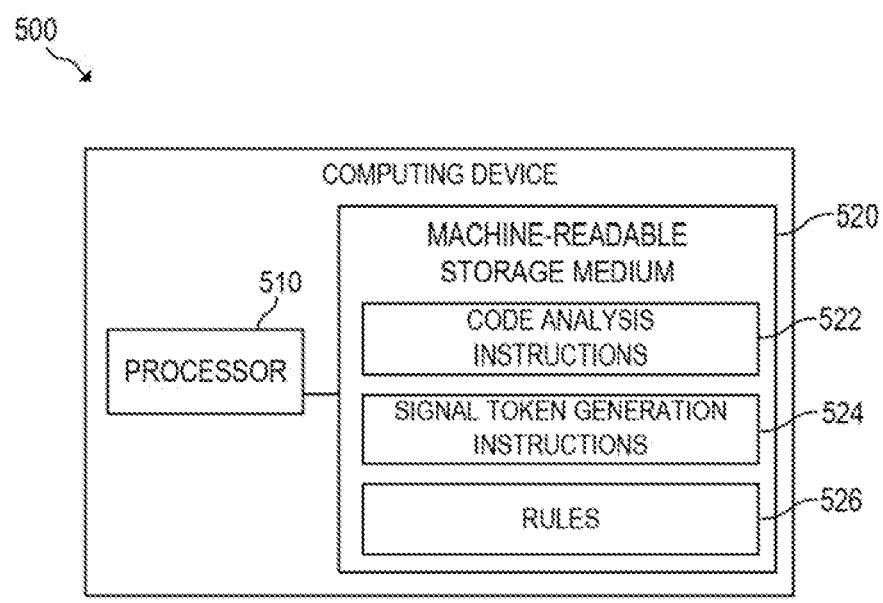
FIG. 5 is a block diagram of a computing device capable of generating signal tokens indicative of malware based on groupings of tokens, according to one example.

FIG. 5 is a block diagram of a computing device capable of generating signal tokens indicative of malware based on groupings of tokens, according to one example. The computing device 500 includes, for example, a processor 510, and a machine-readable storage medium 520 including instructions 522, 524 for generating signal tokens indicative of malware. Computing device 500 may be, for example, a server, a desktop PC, a workstation, notebook computer, a slate computing device, a portable reading device, a wireless email device, a mobile phone, or any other computing device.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524 to implement methods 300 and/or 400. As an alternative or in addition to retrieving and executing instructions, processor 510 may include at least one integrated circuit (IC), other control logic, other electronic circuits, or combinations thereof that include a number of electronic components for performing the functionality of instructions 522, 524.

Machine-readable storage medium 520 may be any electronic, magnetic, optical, or other physical storage device that contains or stores executable instructions. Thus, machine-readable storage medium may be for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for generating a signal token malware database.

As further described in FIGS. 1-4, code analysis instructions 522 can be used to perform a static code analysis based on rules 526, such as obfuscation tolerant rules, on a first set of known malware code and a second set of known clean code to generate tokens. In some examples, the code can be preprocessed from binaries before the analysis is performed. Further, as noted above, the static code analysis can include at least two of dataflow sources, structural rules, manifest XML, semantic analysis, and control flow. These can be based on rules to generate tokens relating to the respective type of analysis.

The signal token generation instructions 524 can be executed to generate a set of signal tokens indicative of malware based on groupings of the tokens. The groupings can be based on Bayesian classification training. The signal tokens can be used by a device to determine whether another application includes malware.

What is claimed is:
1. A computing device comprising:
   at least one processor;

a memory to store machine executable instructions that, when executed by the at least one processor, cause the at least one processor to:

apply a set of rules to determine a first set of tokens based on a static code analysis performed on a first set of known malware application code, wherein the first set of tokens comprises a given token comprising raw data of the first set of known malware application code identified by a given rule of the applied set of rules;

determine a second set of tokens based on a static code analysis performed on a second set of known clean application code;

apply machine learning to the first and second sets of tokens to determine a third set of tokens indicative of malware; and apply machine learning to classify the third set of tokens into groups associated with different categories of malware, wherein the machine learning is based on training sets of applications associated with malware and applications that are known to be benign.

2. The computing device of claim 1, wherein the first set of known malware application code is in a form of a known malware binary and the second set of known clean application code is in a form of a known clean binary.

3. The computing device of claim 2, wherein the instructions, when executed by the at least one processor, cause the at least one processor to generate at least one of the first set of tokens or the second set of tokens based on obfuscation tolerant rules.

4. The computing device of claim 3, wherein the respective first set of tokens and the respective second set of tokens are generated if one of the set of rules is a hit to corresponding respective binaries.

5. The computing device of claim 1, wherein the instructions, when executed by the at least one processor, cause the at least one processor to apply the machine learning to classify the third set of tokens into groups based on two or more of the following code features:

a null dereference, resource leak, dead code, path manipulation, query string injection, command injection, resource injection, and denial of service.

6. The computing device of claim 1, wherein the memory further stores machine executable instructions that, when executed by the at least one processor, causes the at least one processor to output signal tokens to a signal token malware likeliness database.

7. A method comprising:

performing code analysis based on rules on a first set of known malware application code and a second set of known clean application code to generate a first plurality of tokens, wherein performing the code analysis comprises applying a control flow rule, and wherein the first plurality of tokens comprises a first token comprising raw data of the first set of known malware application code and a second token comprising raw data of the second set of known clean application code;

applying machine learning to the first plurality of tokens to determine a second plurality of tokens indicative of malware; and applying machine learning to classify the second plurality of tokens into groups associated with different categories of malware, wherein the machine learning is based on training sets of applications associated with malware and applications that are known to be benign.

8. The method of claim 7, wherein the rules include obfuscation tolerant rules.

9. The method of claim 7, wherein the groups associated with different categories of malware comprise at least two of:

toll fraud, rooting, abuse of permissions, application installed as a service, sensitive data retrieval, use of reflection, use of dynamic loading, and privacy violation.

10. The method of claim 9, wherein the toll fraud includes use of a send text message function, wherein the rooting includes gaining privileged access to a device, wherein abuse of permissions includes requesting permissions above a particular threshold, and sensitive data retrieval includes a call to an Application Programming Interface to retrieve device specific information.

11. The method of claim 9, wherein the use of reflection includes use of a function to download instructions.

12. A non-transitory machine-readable storage medium storing instructions that, if executed by at least one processor of a computing device, cause the computing device to:

perform a static code analysis based on obfuscation tolerant rules on a first set of known malware binaries and a second set of known clean binaries to generate first tokens associated with the first set of known malware binaries and second tokens associated with the second set of known clean binaries, wherein performing the static code analysis comprises applying a rule to examine a structural relationship of elements within an abstract syntax tree, wherein the first tokens comprise a first token comprising raw data of the first set of known malware binaries to which the rule is applied and a second token of the second tokens comprising raw data of the second set of known clean binaries to which the rule is applied;

apply machine learning to the first tokens and the second tokens to determine third tokens indicative of malware; and apply machine learning to classify the third tokens indicative of malware into groups associated with different categories of malware, wherein the machine learning is based on training sets of applications associated with malware and applications that are known to be benign.

13. The non-transitory machine-readable storage medium of claim 12, wherein the static code analysis further includes at least two of dataflow sources, structural rules, manifest Extensible Markup Language, semantic analysis, and control flow.

14. The computing device of claim 1, wherein the memory stores instructions that, when executed by the at least one processor, cause the at least one processor to group the first set of tokens based on a density or a collocation of the first set of tokens.

15. The non-transitory machine-readable storage medium of claim 12, wherein the non-transitory machine-readable storage medium further stores instructions that, if executed by the at least one processor, cause the computing device to group the first tokens based on a density or a collocation of the first tokens.

16. The method of claim 7, wherein applying the control flow rule comprises determining a pattern of program code associated with a call graph.

* * * * *